(No Model.)
O. C. HAGEMANN.
PROCESS OF PURIFYING AND CONCENTRATING GLYCERINE.
No. 453,834. Patented June 9, 1891.
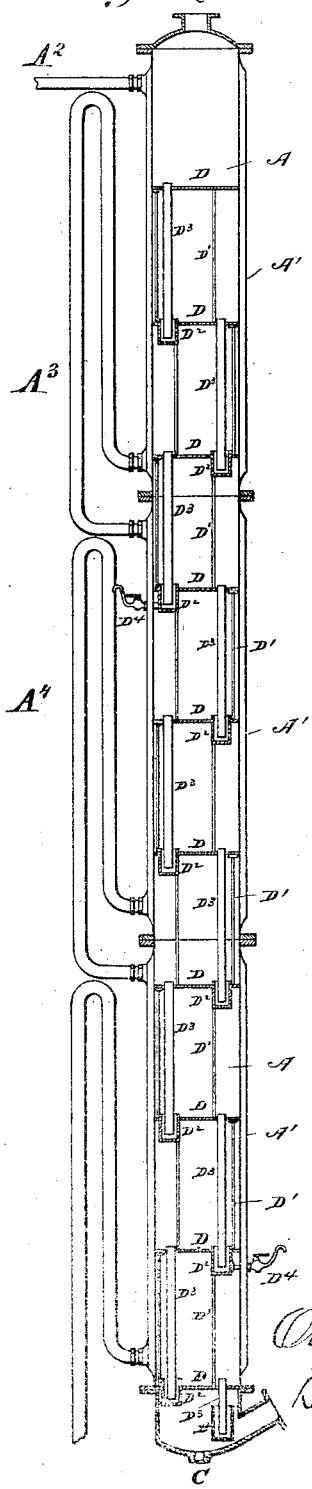
Witnesses,
S. T. Mann
F. C. Goodwin
Inventor.
Otto Christian Hagemann
By Offield & Towle
Att'ys

UNITED STATES PATENT OFFICE.

OTTO CHRISTIAN HAGEMANN, OF LONDON, ENGLAND, ASSIGNOR TO JAMES S. KIRK & CO., OF CHICAGO, ILLINOIS.

PROCESS OF PURIFYING AND CONCENTRATING GLYCERINE.

SPECIFICATION forming part of Letters Patent No. 453,834, dated June 9, 1891.

Application filed September 26, 1890. Serial No. 366,255. (No model.) Patented in England July 1, 1885, No. 7,973.

*To all whom it may concern:*

Be it known that I, OTTO CHRISTIAN HAGEMANN, of London, England, have invented certain new and useful Improvements in Purifying and Concentrating Glycerine, (for which I have received Letters Patent of Great Britain, No. 7,973, dated July 1, 1885,) of which the following is a specification.

In the process of distilling glycerine it is found that an appreciable quantity of impurities passes over together with the mixed vapors of glycerine and water. In order to separate these and obtain liquid glycerine in a pure and concentrated form, I cause the vapors to pass through an apparatus such as hereinafter described. The apparatus consists of an upright cylinder or casing containing shelves or trays, one above the other. The trays are perforated, so that the vapor which enters at the bottom is able to ascend through the apparatus. Condensed liquor accumulates on the trays to a depth which in each case is controlled by an overflow-pipe. This pipe descends to the tray below, and there its lower end dips into a cup or well provided in this tray, and the liquor in the well, rising above the lower end of the pipe, forms a liquid seal and prevents the rise of the vapors through the overflow-pipe. The hot ascending vapor at every tray has to force its way through the layer of liquid resting on the tray. The lowest tray is the first which the vapor meets and it is the hottest. The liquid upon it is glycerine with little or no water. The vapor in passing through this liquid glycerine is washed and deposits inorganic and other impurities. A like action takes place on a tray or trays above until practically all the impurities have been washed out. The vapor still ascending through trays which are progressively cooler and cooler, condensation takes place more and more rapidly. At first but little water-vapor is condensed, the liquid deposited being a concentrated glycerine; but at each successive tray more water goes down and less glycerine, because a considerable proportion of the latter has already been removed from the vapor and deposited on the trays below. When the apparatus is properly worked, the liquor on the top tray of the series will be water containing scarcely any glycerine, and the vapor in rising through it will deposit the last of the glycerine, leaving only steam and volatile impurities, which may be allowed to escape. The very weak glycerine deposited on the upper tray descends by the overflow-pipes from tray to tray, and as it does so the water, being the more volatile, is evaporated in larger proportion. The water travels upward as vapor, while the glycerine travels downward in the liquid state. On each successive tray in descending the series more and more concentrated glycerine is found, and the product when fully concentrated is drawn off. The outlet is by a pipe passing to the exterior from the well of one of the trays, and several of the trays may be thus provided with means for drawing off, so that the most suitable level may be selected. If the product be drawn off at too high a level, it will not be sufficiently concentrated. On the other hand, if it be drawn off at too low a point it will not have been sufficiently freed from impurities.

In the drawings, Figure 1 is a vertical section of a suitable apparatus for carrying out my improved process; and Fig. 2 is a sectional detail of one of the plates D.

A A is a cylinder made in sections, and each section furnished with a jacket $A'$ $A'$, through which water may be circulated.

The object of circulating the water through the jacket is to control the temperature of the ascending vapors in the column. The water is fed in cold through the pipe $A^2$ and in such quantity as to maintain the temperature at the top of the column at about boiling-water point. The water fed in at the top pipe $A^2$ fills the jacket of the top section of the column and becomes heated by the ascending vapors in the column. It then overflows through the siphon $A^3$ and down into the next section, where it becomes further heated by the ascending vapors, and thence overflows through the siphon $A^4$, attached to the middle section of the column to the jacket of the lower section, and from thence passes away through the siphon of the lower jacket-section highly heated, usually boiling. The overflow-pipes are made in the form of siphons, so that the uppermost jacket of the column may be first filled with water, and the water can only descend to the next lower section of the column when the upper section is filled. This enables the operator to control the exit temperature of the vapors by regulating the feed of water through the pipe $A^2$. The ends C C are of brass, and so also are trays D D, arranged at distances apart within the cylinder, which they fit closely. The trays are supported in any convenient manner, as by legs D' D'. Each tray is perforated with holes, preferably conical, and, say, one-tenth of an inch in shortest diameter.

$D^2$ is a cup or well with which each tray is provided, and a pipe $D^3$ brings down liquor into the cavity from the tray above. Each tray is furnished with its overflow-pipe $D^3$. I prefer to provide a series of these columns, such as shown, arranged side by side and connected together in series, the top of one column with the bottom of the next. The lower part of the first column of the series receives from the still, through the inlet, mixed vapors containing glycerine, water, and suspended impurities.

The vapor from the still, entering at the bottom of the first column of the series, passes up through the perforations in the trays, and at each stage it bubbles through a shallow layer of liquid resting upon the tray. As the vapor progressively cools condensation takes place, glycerine with but little water is deposited on the lower trays, and on the higher trays mixtures of glycerine and water in varying proportions having lower and lower boiling-points as the exit end of the condenser is approached. The liquid on the lower and hottest tray stops the suspended impurities by washing them out from the ascending vapors. Passing this stage a zone is arrived at where much glycerine is condensed, while water and impurities more volatile than glycerine pass on. Finally at the end of the series steam (with volatile impurities) blows out from the condenser, for even at the farther end a temperature of about the boiling-point of water is maintained.

The number of columns in use at a time will be varied according to circumstances.

I draw off purified and concentrated glycerine from one or the other of the wells $D^2$ of the trays D by taps $D^4$; also, at the bottom of the first column I draw off an impure glycerine. I also draw off glycerine from the bottoms of the succeeding columns. Volatile organic impurities will be found more or less in the glycerine from the last column.

I usually employ three columns in series, the first column without jackets.

I provide two receivers—one for the glycerine of the purity required and the other for the comparatively impure glycerine. I select the part of the apparatus from which to draw the purified and concentrated glycerine by drawing samples by the taps $D^4$. I draw the product into the pure-glycerine receiver by the draw-off cocks nearest to the still, which yields a glycerine coming up to the standard of purity required. When the working of the still has been thus adjusted, the operation continues, care only being required to maintain the temperature in the various parts of the condenser without change. The temperatures are observed by the aid of thermometers. These condensing-columns are very usefully employed in the concentration of weak solutions of glycerine. In boiling these down in the open or in vacuum much glycerine is at present lost, which is recovered when the boiling is conducted in a close vessel and the vapor led into a condensing-column such as herein described.

The degree of concentration of the product is dependent on the temperature and vapor tension maintained in the condenser. When the apparatus is of large diameter, I prefer to provide it with a centrally-located pipe or pipes, providing a temperature-controlling chamber, which may be filled with a heating or cooling agent.

I claim—

1. The herein-described improvement in the purification of glycerine, which consists in passing the distilling-vapors through successive bodies the product of condensation of similar vapors, whereby the water and volatile impurities are driven off and the glycerine is condensed, concentrated, and collected.

2. The herein-described improvement in the purification of glycerine, which consists in passing the distilling-vapors through successive bodies the product of condensation of similar vapors confined in a series of closed chambers, whereby the volatile impurities are driven off, the suspended impurities collected and removed, and the purified glycerine condensed and separated, substantially as described.

OTTO CHRISTIAN HAGEMANN.

Witnesses:
OLIVER R. JOHNSON,
A. E. MOBERLY,
  *Consulate Gen'l. U. S. A., London.*